US011896985B2

(12) United States Patent
Le Strat et al.

(10) Patent No.: US 11,896,985 B2
(45) Date of Patent: Feb. 13, 2024

(54) SYSTEM FOR ANALYSING DROPS AND COATING INSTALLATION COMPRISING SUCH A SYSTEM

(71) Applicant: EXEL INDUSTRIES, Epernay (FR)

(72) Inventors: Cédric Le Strat, Epernay (FR); Juan Guillermo Palacio, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 17/850,305

(22) Filed: Jun. 27, 2022

(65) Prior Publication Data

US 2022/0410197 A1    Dec. 29, 2022

(30) Foreign Application Priority Data

Jun. 28, 2021 (FR) ..................................... 2106919

(51) Int. Cl.
*B05B 12/08* (2006.01)
*B05B 13/04* (2006.01)
*B05B 14/00* (2018.01)

(52) U.S. Cl.
CPC ........ *B05B 12/082* (2013.01); *B05B 13/0452* (2013.01); *B05B 14/00* (2018.02)

(58) Field of Classification Search
USPC ....... 118/712, 713, 313, 315, 323, 321, 319, 118/320, 326
See application file for complete search history.

(56) References Cited

U.S. PATENT DOCUMENTS

| 2002/0089561 | A1* | 7/2002 | Weitzel | ................. G01F 17/00 347/19 |
| 2006/0107211 | A1* | 5/2006 | Mirtich | .............. G06F 3/04847 715/965 |
| 2007/0271812 | A1* | 11/2007 | Swoboda | ............. F26B 25/008 34/275 |
| 2011/0061591 | A1* | 3/2011 | Stecker | .................. B33Y 40/00 118/663 |
| 2018/0052088 | A1* | 2/2018 | Sarkar | ................ G01N 15/0227 |
| 2019/0308211 | A1 | 10/2019 | Fritz et al. | |

(Continued)

FOREIGN PATENT DOCUMENTS

| CN | 110553952 A | 12/2019 |
| DE | 199 54 702 A1 | 5/2001 |

(Continued)

OTHER PUBLICATIONS

English Translation DE 102004041671A1 (Year: 2004).*
Search Report as issued in French Patent Application No. 2106919, dated Mar. 16, 2022.

*Primary Examiner* — Yewebdar T Tadesse
(74) *Attorney, Agent, or Firm* — Pillsbury Winthrop Shaw Pittman LLP

(57) ABSTRACT

A system for analysing drops capable of being ejected by a coating product applicator, includes a light source configured to illuminate a drop ejection zone, designated observation zone; a first image acquisition device configured to acquire an image of the observation zone; and an image analyser configured to determine, from the image of the observation zone, the presence of drops at a given distance from the applicator, the size of the drops and the absence of satellite; the light source and the first image acquisition device being situated on a same side of the observation zone.

16 Claims, 3 Drawing Sheets

(56) References Cited

U.S. PATENT DOCUMENTS

| | | |
|---|---|---|
| 2020/0393480 A1 | 12/2020 | Daume et al. |
| 2022/0040719 A1 | 2/2022 | Fritz et al. |
| 2022/0274398 A1* | 9/2022 | Tawata .................... B05B 12/00 |
| 2022/0348006 A1* | 11/2022 | Han .................... G01N 15/1459 |

FOREIGN PATENT DOCUMENTS

| | | |
|---|---|---|
| DE | 10 2004 041671 A1 | 3/2006 |
| EP | 3 751 289 A1 | 12/2020 |
| FR | 3 087 679 B1 | 11/2020 |
| WO | WO 2016/145000 A1 | 9/2016 |

* cited by examiner

SYSTEM FOR ANALYSING DROPS AND COATING INSTALLATION COMPRISING SUCH A SYSTEM

CROSS-REFERENCE TO RELATED APPLICATIONS

This application claims priority to French Patent Application No. 2106919, filed Jun. 28, 2021, the entire content of which is incorporated herein by reference in its entirety.

FIELD

The technical field of the invention is that of surface coating according to DOD (Drop On Demand) technology. The present invention more particularly relates to a system for analysing drops ejected by a coating product applicator and a coating installation comprising an applicator and a system for analysing drops.

BACKGROUND

Drop on demand (DOD) technology consists in depositing on a surface a coating product in the form of drops, which has the advantage of depositing only the amount of product necessary to coat the surface. This technology can notably be used to paint patterns (such as strips) on vehicle bodyworks and thus to personalise vehicles, typically sports cars.

The patent FR3087679B1 describes a coating installation operating according to DOD technology. This installation comprises a conveyor making it possible to displace vehicle bodyworks, a multi-axis robot provided with a moveable arm and a coating product applicator mounted at an end of the moveable arm of the robot. The applicator is a print head comprising a row of nozzles through which flows the coating product, typically paint. The nozzles are configured to deposit the paint m drop by drop.

It is useful to observe and analyse the drops ejected by the nozzles to perfect the applicator, to check its correct operation before and/or after an application cycle or instead to elaborate coating products.

Systems for observing and analysing drops known from the prior art comprise a lighting device and an image acquisition device situated facing the lighting device. The print head is positioned between the image acquisition device and the lighting device, so as to observe the drops against the light.

The document US2019/308211A1 furthermore describes a coating installation comprising a print head and a system for observing drops making it possible to detect the partial or total clogging of the nozzles of the print head. The observation system comprises an image sensor oriented towards a nozzle ejection zone and a lighting device situated in the visual field of the image sensor, on the side opposite the ejection zone. The image sensor acquires an image of the drops delivered by the nozzles. The image is next analysed to detect errors, such as the absence of drops due to clogging of a nozzle.

Observation systems such as that of the document US2019/308211A1 are difficult to adjust because the amount of light perceived by the image sensor depends on the number of drops in its visual field. It is thus necessary to regularly adjust the power of the lighting or the sensitivity of the image sensor.

SUMMARY

It can be seen that there exists a need to provide a system for observing and analysing drops that is simpler to use.

According to a first aspect of the invention, this need tends to be satisfied by providing a system for analysing drops capable of being ejected by a coating product applicator, the system comprising:
  a light source configured to illuminate a drop ejection zone, designated observation zone;
  a first image acquisition device configured to acquire an image of the observation zone;
  an image analyser configured to determine, from the image of the observation zone, the presence of drops at a given distance from the applicator, the size of the drops and the absence of satellite;
and wherein the light source and the first image acquisition device are situated on a same side of the observation zone.

By placing the first image acquisition device on the same side of the observation zone as the light source (rather than opposite), the risk of dazzling the first image acquisition device is decreased. The result is that the system for analysing drops according to the invention is easier to use (in particular to adjust) than systems for observing drops of the prior art operating according to the ombroscopy principle.

Further, thanks to this arrangement, the light source and the first image acquisition device may be more easily installed outside of a coating cabin and thus do not need to comply with regulations relating to explosive atmospheres (ATEX in Europe).

In an embodiment, the system for analysing drops further comprises a second image acquisition device configured to acquire an image of the observation zone and arranged on the same side of the observation zone as the light source and the first image acquisition device.

According to a development of this embodiment, the first and second image acquisition devices are situated on either side of the light source.

Apart from the characteristics that have been mentioned in the preceding paragraphs, the system for analysing drops according to the first aspect of the invention may have one or more complementary characteristics among the following, considered individually or according to all technically possible combinations thereof:
  the light source has a light propagation axis;
  the first image acquisition device has a first optical axis situated in a same plane as the light propagation axis;
  the first optical axis forms with the light propagation axis an angle greater than or equal to 0° and less than or equal to 45°;
  the second image acquisition device has a second optical axis situated in a same plane as the light propagation axis;
  the second optical axis forms with the light propagation axis an angle greater than or equal to 0° and less than or equal to 45°; this makes it possible to obtain an image in 3 dimensions, in the same field of vision, which makes it possible to increase the precision of the observation;
  the system further comprises a background situated opposite the light source with respect to the observation zone, the background comprising a first part having a first hue, for example dark, for example black, and a second part having a second hue, in an embodiment light, for example white, the first hue being darker than the second hue; this makes it possible to improve the observation of different hues without having need to change background as a function of the hue observed, thanks to a contrast between the background and the observed coating product, for example paint;

the system comprises a background situated opposite the light source with respect to the observation zone and the light source is configured to illuminate the background with a colour complementary to that of the drops to analyse; this makes it possible to maximise the contrast between the background and the observed paint hue, which improves the precision of the observation;

the background is fixed with respect to the light source and to the first image acquisition device; it is a simple and easy to implement architecture, further avoiding having to comply with the constraints of explosive atmosphere standards;

the background is moveably mounted with respect to the light source and to the first image acquisition device; this makes it possible to displace the background rather than have to displace the print head to be able to carry out an observation, and also to obtain a wider field of vision for the observations;

the background is a disc rotationally mounted with respect to the light source and to the first image acquisition device;

the background has a rectangular shape and is translationally mounted with respect to the light source and to the first image acquisition device;

the first image acquisition device is configured to acquire images of the observation zone at an acquisition frequency less than or equal to the drop ejection frequency divided by two, and in an embodiment at an acquisition frequency less than or equal to the drop ejection frequency divided by five; this makes it possible to limit the performance constraints of the image acquisition device, and to increase the compatibility between the invention and image acquisition devices;

the first image acquisition device is controlled by a circuit for controlling the ejection of drops; it is a simpler to implement control system, which makes it possible to do without a dedicated image acquisition control system;

the second image acquisition device is configured to acquire images of the observation zone at an acquisition frequency less than or equal to the drop ejection frequency divided by two, and, in an embodiment, at an acquisition frequency less than or equal to the drop ejection frequency divided by five;

the second image acquisition device is controlled by the circuit for controlling the ejection of drops;

the first image acquisition device comprises a black and white image sensor or a colour image sensor; a black and white sensor offers better sensitivity, and could notably be sensitive to the variation in contrast offered by the lighting of the background with a hue complementary to the observed paint hue;

the second image acquisition device comprises a black and white image sensor or a colour image sensor;

the light source is a stroboscope;

the stroboscope is controlled by a circuit for controlling the ejection of drops;

the frequency of the stroboscope is equal to n times the acquisition frequency, with n a natural integer greater than or equal to 2, and in an embodiment greater than or equal to 5;

the frequency of the stroboscope is less than or equal to the drop ejection frequency; this makes it possible to limit the needs for adjusting the optical device, even when the drop ejection frequency increases, by limiting the activation of the lighting when the ejection frequency increases, which makes it possible to avoid dazzling the optical sensor;

the light source comprises at least one Chip On Board (COB) LED; it is a simple to use device, which offers considerable lighting power;

the light source comprises several LED capable of emitting radiations of different wavelengths; and the image analyser is further configured to determine, from the image of the observation zone, one or more characteristics chosen from among the following: the direction of the drops, the shape of the drops, the point of creation of the drops and the speed of the drops.

A second aspect of the invention relates to a coating installation comprising:

a multi-axis robot comprising a moveable arm;

a coating product applicator mounted at an end of the moveable arm and comprising at least one drop ejection nozzle; and a system for analysing drops according to the first aspect of the invention.

In a first embodiment, the coating installation further comprises:

a cabin in which the multi-axis robot is arranged;

at least one glazed wall;

the light source and the first image acquisition device being arranged outside of the cabin and separated from the observation zone by the at least one glazed wall.

According to a development of this first embodiment, the at least one glazed wall belongs to the cabin.

According to another development, the system for analysing drops comprises a casing, the at least one glazed wall belongs to the casing and the casing is arranged in an opening made in a side wall of the cabin.

In a second embodiment, the coating installation further comprises:

a cabin in which the multi-axis robot is arranged;

a caisson arranged inside the cabin and provided with at least one glazed wall;

the light source and the first image acquisition device being arranged inside the caisson and separated from the observation zone by the at least one glazed wall.

According to a development of this second embodiment, the coating installation further comprises means for pressurising the caisson.

Apart from the characteristics that have been mentioned in the preceding paragraphs, the coating installation according to the second aspect of the invention may have one or more complementary characteristics among the following, considered individually or according to all technically possible combinations thereof:

the coating installation comprises a single glazed wall oriented perpendicularly to a light propagation axis of the light source;

the coating installation comprises a first glazed wall oriented perpendicularly to a light propagation axis of the light source and a second glazed wall oriented perpendicularly to an optical axis of the first image acquisition device;

the system for analysing drops further comprises a third image acquisition device oriented towards a face of the applicator in which the at least one drop ejection nozzle is arranged;

the third image acquisition device comprises a black and white image sensor or a colour image sensor; and the applicator is a drop on demand (DOD) type print head.

The invention and the different applications thereof will be better understood on reading the description that follows and by examining the figures that accompany it.

BRIEF DESCRIPTION OF THE FIGURES

Other characteristics and benefits of the invention will become clear from the description that is given thereof below, for indicative purposes and in no way limiting, with reference to the appended figures, among which.

For greater clarity, identical or similar elements are marked by identical reference signs in all of the figures.

DETAILED DESCRIPTION

Figure 1:
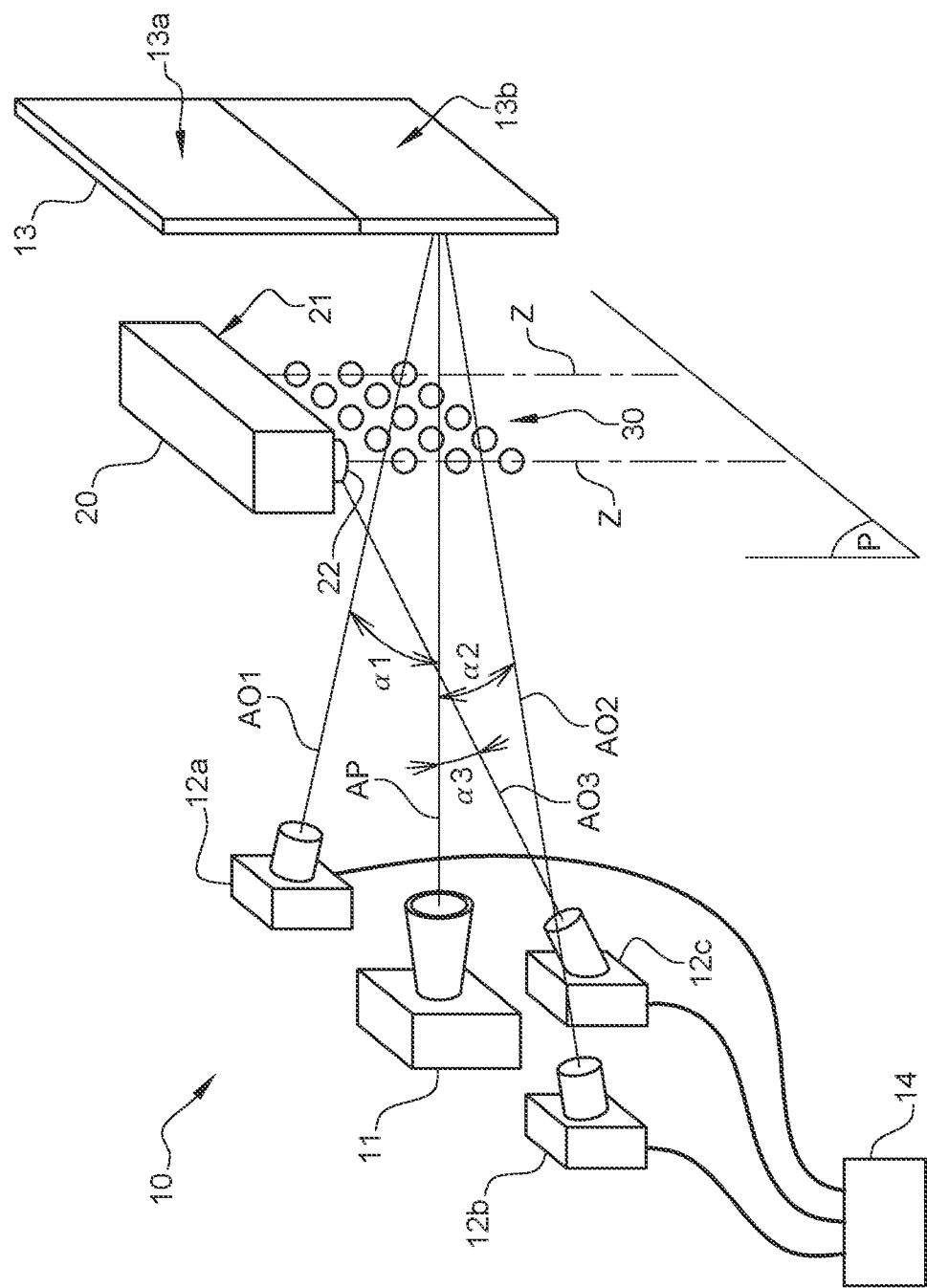
FIG. 1 represents an embodiment of a system for analysing drops according to the first aspect of the invention.

FIG. 1 is a schematic perspective view of a system for analysing drops 10 according to an embodiment.

The analysis system 10 is here represented in operating situation, in the presence of a coating product applicator 20. The applicator 20 comprises an ejection face 21 and at least one drop ejection nozzle 22 arranged in the ejection face 21. The applicator 20 comprises one or more rows of drop ejection nozzles 22. The number of nozzles 22 in each row may be comprised between 10 and 100.

The applicator 20 is, in an embodiment, a print head operating according to drop on demand (DOD) technology. Each nozzle 22 is configured to deposit the coating product drop by drop. The coating product taken as example hereafter is paint, but it may also be a primer, a varnish or a more viscous product such as an adhesive or a mastic.

The analysis system 10 comprises a light source 11 configured to illuminate a drop ejection zone 30 and a first image acquisition device 12a configured to acquire at least one image of the drop ejection zone 30. More particularly, the first image acquisition device 12a is oriented towards the drop ejection zone 30, hereafter called observation zone (or analysis zone). The observation zone 30 is a zone above which the applicator 20 comes to be positioned when it is wished to carry out an analysis of the drops.

The light source 11 and the first image acquisition device 12a are arranged on a same side of the observation zone 30. In other words, the light source 11 and the first image acquisition device 12a are arranged to respectively illuminate the observation zone 30 and to acquire an image of the observation zone 30 (substantially) in the same direction, and not in opposite directions.

The light source 11 is, in an embodiment, a projector (that is to say a directional light source) oriented towards the observation zone 30. It has an optical axis AP which traverses the observation zone 30. The optical axis AP of the light source 11, hereafter called light propagation axis, is defined as the axis of symmetry of the beam of light rays emitted by the light source 11. The light propagation axis AP is beneficially perpendicular to a first plane P containing the ejection axes z of the nozzles 22 belonging to a same row. It is then perpendicular to the "curtain" of drops ejected by the nozzles 21 (in normal operation). The ejection axes z of the nozzles 21 are, in an embodiment, oriented perpendicularly to the ejection face 22 of the applicator 20.

The first image acquisition device 12a comprises a first image sensor and a first lens with variable (zoom) or fixed focus. The image acquisition device 12a is for example a photographic apparatus or a video camera.

The first image acquisition device 12a has an optical axis AO1 which is traverses the observation zone 30. The optical axis AO1 of the first image acquisition device 12a and the light propagation axis AP are beneficially situated in a second plane. This second plane is, in an embodiment, perpendicular to the first plane P and parallel to the ejection face 21. The optical axis AO1 of the first image acquisition device 12a is defined as the axis of the first image sensor (it passes through the centre of an array of pixels belonging to the first image sensor). It forms with the light propagation axis AP an angle α1 greater than or equal to 0° and less than or equal to 45°, and, in an embodiment, comprised between 0° and 20° (inclusive). Thus, the optical axis AO1 of the first image acquisition device 12a may be parallel to the light propagation axis AP.

In the embodiment of FIG. 1, the analysis system 10 further comprises a second image acquisition device 12b oriented towards the observation zone 30 and arranged on the same side of the observation zone 30 as the light source 11 and the first image acquisition device 12a. This second image acquisition device 12b makes it possible to determine the direction of the drops and more particularly to detect a deviation with respect to the ejection axis z of the nozzles 22. Such a deviation cannot be detected by the first image acquisition device 12a alone when the direction of the drops ejected by a nozzle 22 remains in a plane containing the optical axis AO1 and the ejection axis z of this nozzle 22.

The second image acquisition device 12b is, in an embodiment, identical to the first image acquisition device 12a. It comprises a second image sensor and a second lens with variable or fixed focus. The second image acquisition device 12a is for example a photographic apparatus or a video camera.

For the sake of simplicity, the term "camera" will be used hereafter to designate an image acquisition device.

The second camera 12b has an optical axis AO2 which traverses the observation zone 30. The optical axis AO2 of the second camera 12b forms with the light propagation axis AP an angle α2 greater than or equal to 0° and less than or equal to 45°, and, in an embodiment, comprised between 0° and 20° (inclusive). It is beneficially situated in the same (second) plane as the light propagation axis AP and the optical axis AO1 of the first camera 12a. However, it does not extend parallel to the optical axis AO1 of the first camera 12a.

The first and second cameras 12a-12b are beneficially situated on either side of the light source 11. Such an arrangement facilitates the determination of the characteristics of the drops, in particular their position and their size. In an alternative, one or more cameras 12 may be equipped with a plurality of light sources 11, for example a plurality of LED forming a circle around the lens.

The first image sensor and the second image sensor are beneficially black and white (monochromatic) image sensors or colour image sensors. Black and white image sensors provide images with a better contrast. A benefit of colour image sensors is to identify a potential problem of rinsing of the nozzles 22. A drawback is that their sensitivity is two to three times lower than that of black and white sensors. A solution for reducing this sensitivity difference is to remove the infrared filter that generally equips colour image sensors. The infrared radiation captured increases the sensitivity, but the image of the observation zone then becomes pinkish, Thus, the first and second image sensors (colour or monochromatic) may be equipped or not with an infrared filter.

The first camera 12a is, in an embodiment, configured to acquire images of the observation zone 30 at an acquisition frequency $f_a$ less than or equal to the drop ejection frequency $f_g$ divided by two, and in an embodiment at an acquisition frequency $f_a$ less than or equal to the drop ejection frequency $f_g$ divided by five. There is thus an acquisition period that comprises three durations: a duration before opening the shutter, an acquisition period $t_a$ and a duration after closing the shutter. In an embodiment, the acquisition period $t_a$ is longer than a drop ejection period. Thus, each image of the observation zone 30 contains in a certain manner at least one drop ejected by each (activated) nozzle situated in the visual field of the first camera.

The acquisition frequency $f_a$ is beneficially comprised between 10 Hz and 30 Hz (i.e. between 10 and 30 images per second), whereas the drop ejection frequency $f_g$ is typically comprised between 20 Hz and 3000 Hz (depending on the displacement speeds of the applicator 20 and the desired resolution). In other words, it is not necessary to use a high speed camera to observe suitably the drops and to determine their characteristics. This has the effect of limiting the cost of the analysis system 10.

The taking of shots by the first camera 12a may be triggered by means of a signal sent by a control circuit (driver) of the applicator 20, this control circuit being charged with controlling the ejection of the drops.

The second camera 12b is synchronised with the first camera 12a, for example thanks to the same signal sent by the control circuit. In other words, the taking of shots by the cameras 12a-12b is triggered at the same moment. The acquisition frequency of the second camera 12a is beneficially the same as that of the first camera 12a.

The light source 11 is, in an embodiment, a stroboscope. The use of a stroboscope makes it possible to obtain clear images of the drops while they are in movement. Each flash of light produced by the stroboscope may be out of phase with respect to the ejection of a drop by a parameterizable value (from the signal sent by the control circuit of the applicator 20), in order to capture the image of this drop at an expected distance from the applicator 20. The frequency $f_s$ of the stroboscope is beneficially equal to n times the acquisition frequency $f_a$, with n a natural integer greater than or equal to 2, and in an embodiment greater than or equal to 5. Thus, the observation zone 30 receives at least two flashes of light during the exposure time of the first camera 12a (and of the second camera 12b, in an embodiment). The result is that each image represents several superimposed views of the observation zone 30 and may contain several times the same drop, but at different positions or several different drops at the same spot and/or a combination of both. However, it is not necessary to take an image of all the drops ejected by a nozzle. Indeed, the risk is then to have too many drops partially or totally superimposed on an image, which could falsify the measurement of the size of the unitary drop. The frequency $f_s$ of the stroboscope may thus be less than or equal to the drop ejection frequency $f_g$.

As an example, if the image acquisition frequency $f_a$ is 25 Hz and if the drop ejection frequency $f_g$ is 1000 Hz, then the frequency of the stroboscope $f_s$ may be comprised between 50 Hz and 1000 Hz, Typically, a frequency of the stroboscope $f_s$ equal to 5 times the acquisition frequency will be chosen, i.e. 125 Hz.

As indicated previously, the light source 11, the first camera 12a and (if needs be) the second camera 12b are situated on the same side of the observation zone 30. The lighting of the drops thus takes place in the same sense as the observation, unlike observation systems of the prior art. This arrangement simplifies the use of the analysis system 10, in particular the adjustment phase, because the amount of light perceived by each camera varies very little as a function of the number of drops present in its visual field. It is thus possible to observe more than one hundred or so drops without having to adjust the power of the light source 11 or the sensitivity of the image sensor.

This is all the more beneficial when the frequency $f_s$ of the stroboscope is important. For example, if the acquisition frequency of the image sensors is 25 Hz and if the frequency $f_s$ of the stroboscope is 100 Hz, then each image receives 4 flashes of light. Image sensors placed facing the stroboscope (that is to say under direct lighting) thus risk being very quickly dazzled.

The grouping together of the light source 11 and the cameras 12a-12b further facilitates the perception of the paint hues and makes possible, as will be described later with reference to FIGS. 4 and 5, the installation of the analysis system 10 outside of a paint coating cabin.

The light source 11 is in an embodiment an LED lamp. An LED lamp is capable of generating very short light pulses and beneficially replaces a discharge lamp. The light source 11 may comprise at least one LED on printed circuit, also called COB ("Chip On Board") LED, in other words an assembly of several elementary LED on a same substrate. This type of LED is beneficial because it makes it possible to concentrate the luminous intensity without the dissipated power being conveyed by the light. This avoids that the observation zone, which may be an explosive atmosphere zone, is heated by the light.

The light source 11 may also comprise several LED capable of emitting radiations of different wavelengths, in the visible and infrared domains. Typically, a blue LED, a red LED and a green LED make it possible to reproduce the entire visible spectrum. These different LED may be several COB LED, several elementary LED within a same COB LED, or even several LED of another type.

By varying the wavelength of the electromagnetic radiation emitted by the light source 11, for example as a function of the hue of the paint, it is possible to improve the contrast of the images and to facilitate their interpretation.

The production of flashes of different colours further makes it possible to differentiate the positions of a same drop on a same image (by different colours) and consequently to determine more easily the speed of displacement of the drops.

Alternatively, a single yellow or white COB LED (without possibility of adjustment of the mixture of wavelengths) will be able to be favoured to produce yellow or white lighting.

Still with reference to FIG. 1, the analysis system 10 may comprise a third image acquisition device 12c oriented towards the ejection face 21 of the applicator 20. This third image acquisition device 12c may be of the same type as the first and second image acquisition devices 12a-12b, In particular, it comprises a third image sensor, in an embodiment a black and white image sensor or a colour image sensor. Like the first image sensor and/or the second image sensor, the third sensor may be equipped or not with an infrared filter.

This third camera 12c, of optical axis AO3, makes it possible to check that the ejection face 21 of the applicator 20 is exempt of soiling (dust, paint residues, etc.), to detect potential leaks and to observe the paint meniscuses that form at the level of the nozzles 22. The third camera 12c is for example situated between the first and second cameras 12a-12b vertically to the light source 11.

The optical axis AO3 of the third camera 12c and the light propagation axis AP are beneficially situated in a same third plane. The optical axis AO3 forms with the light propagation axis AP an angle α3 strictly greater than 0° and less than or equal to 60°, and in an embodiment comprised between 20° and 40° (inclusive).

The analysis system 10 may also comprise a background 13 (or screen) situated opposite the light source 11 with respect to the observation zone 30. The background 13 comprises a first part 13a of a first hue and a second part 13b of a second hue, the first hue being darker than the second hue. In other words, the background 13 beneficially comprises a first dark part 13a, for example black, and a second light part 13b, for example white. The analysis of the drops is accomplished in front of the part of the background 13 that procures the best image contrast, according to the hue of the paint used. More particularly, the first dark part 13a is used for light paint hues and the second light part 13b is used for dark paint hues. To facilitate analysis of the images, the background 13 may also comprise in each zone a graduated horizontal or vertical scale, a grid pattern or simply horizontal or vertical lines (not represented in FIG. 1).

Still with the aim of improving the contrast, the background 13 may be illuminated by a colour complementary to that of the drops to analyse (drops of paint for example). The light source 11 may be configured to illuminate the background 13 of this complementary colour. Alternatively, the analysis system 10 may comprise an additional lighting device (distinct from the light source 11).

The background 13 may be fixed or moveable with respect to the light source 11 and to the cameras 12a-12c. The background 13 is, in an embodiment, moveably mounted translationally (for example by means of a slide or a jack) or rotationally (for example by means of a motor or a rotary jack).

Figure 2:
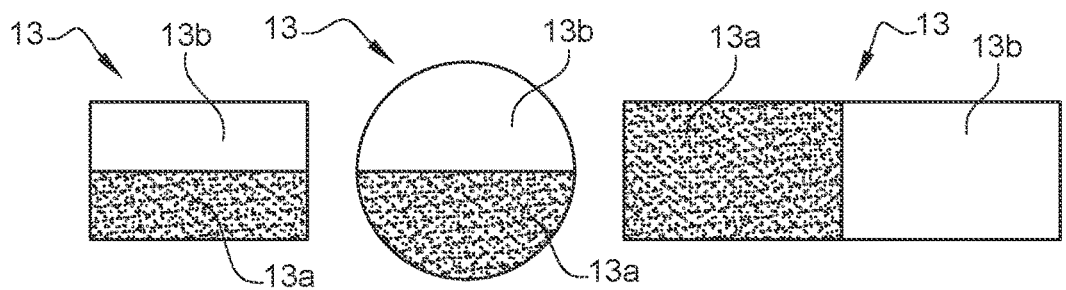
FIG. 2 represents several configurations of a background or screen belonging to the system for analysing drops of FIG. 1.

FIG. 2 represents several possible configurations of the background 13. In a first configuration illustrated on the left of FIG. 2 (and in FIG. 1), the background 13 has a rectangular shape. The first dark part 13a constitutes a lower part of the background 13, whereas the second light part 13b constitutes an upper part of the background 13. This rectangular background is beneficially translationally mounted (vertically) with respect to the light source 11 and to the cameras 12a-12c.

In a second configuration illustrated on the right of FIG. 2, the background 13 also has a rectangular shape. The first dark part. 13a constitutes a left part, whereas the second light part 13b constitutes a right part (in the sense of observation of the cameras 12a-12b). The rectangular background is beneficially translationally (laterally) mounted with respect to the light source 11 and to the cameras 12a-12c.

In each of these two configurations, the first and second parts 13a-13b of the background 13 may be reversed.

In a third configuration illustrated at the centre of FIG. 2, the background 13 is a disc. The first dark part 13a constitutes a first half of the disc, whereas the second light part 13b constitutes a second half of the disc. This disc shaped background 13 is beneficially rotationally mounted with respect to the light source 11 and to the cameras 12a-12c.

Finally, the analysis system 10 comprises an image analyser 14 (cf. FIG. 1) configured to determine, from an image of the observation zone 30, the presence of drops at a given distance from the applicator 20, the size of the drops and the absence of satellite. The presence of drops at a given distance from the applicator 20 makes it possible to check (as a first approximation) if the drops are ejected at the correct time, at the correct speed and in the correct direction. The size of the drops makes it possible to calculate the amount of paint deposited, to determine wear of the print head or to determine a drift in the supply pressures or viscoelastic properties of the coating product (if the measured drop is larger than expected). Finally, satellites are secondary drops of smaller size which may accompany the desired (main) drops and be the cause of printing defects (such as smudges) on the support to paint. These satellites are consequently to avoid.

The image analyser 14 comprises image analysis software instructions (stored on a non-transitory machine readable medium) being able to be executed by a computer or a calculator (e.g, processor) belonging to an electronic board. The images acquired by the cameras) and the results of the analysis are beneficially stored in a memory which may be internal or external to the computer or the electronic board. The computer may be equipped with a screen for viewing the images and the results of the analysis.

Figure 3:
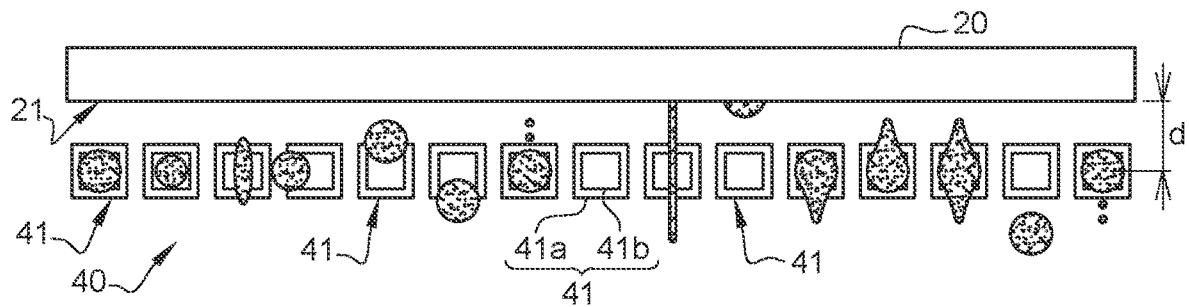
FIG. 3 illustrates the principle of an image analysis technique capable of being implemented by the system for analysing drops of FIG. 1.

FIG. 3 schematically represents an image analysis technique that may be implemented by the image analyser 14 to determine the presence of drops, the size of the drops and the absence of satellite.

This technique comprises the superimposition of a digital tracing 40 on the image to analyse. The digital tracing 40 comprises one or more envelopes 41, the dimensions of which are defined as a function of the expected size of the drops. In an embodiment, the digital tracing 40 comprises as many envelopes 41 as there are nozzles 22 in a row. Thus, each ejected drop corresponds to an envelope 41. The envelopes 41 have for example a square or round shape. They may be aligned, as is represented in FIG. 3, even though this is not obligatory.

Each envelope 41 may comprise a tolerance zone delimited by a first window 41a corresponding to a maximum size of the drops and a second window 41b corresponding to a minimum size of the drops.

The digital tracing 40 is superimposed on the image to analyse such that each envelope 41 is positioned at a given distance d from the image of the applicator 20. The distance d associated with each envelope 41 is measured between the ejection face 21 of the applicator 20 and the centre of the envelope 41. It is a function of the spot where the drop should normally be situated when the shot is taken. The distance d is for example equal to the distance which separates the ejection face 21 of the applicator 20 and the support to coat during the application of paint. The latter distance is hereafter called "application distance".

If a drop is not entirely contained in the corresponding envelope 41 and/or if its periphery is not situated mainly in the tolerance zone, then it may be considered that the drop is not present at the desired distance at the moment the shot is taken and/or that its size is not adequate. The detection of pixels (representing paint) situated outside of the envelope 41 and distinct from those contained in the envelope 41 signifies that one or several satellites are present.

In the example of FIG. 3, only the drop the most to the left is considered as good, because it is situated at the desired location (distance d), it has an adequate size (within the limits of the envelope 41) and it is exempt of satellite. Conversely, the second drop starting from the left is too small and the final drop (the furthest right) is accompanied by satellites.

The digital tracing 40 may be generated manually, semi-automatically or in a completely automatic manner. In manual mode, the user of the analysis system 10 entirely defines the envelopes 41 (shape, size and position). In semi-automatic mode, the image analyser 14 generates envelopes 41 from a reference image containing a drop and proposes to the user to correct them before validating them. In automatic mode, the image analyser 14 generates envelopes from several reference images (typically more than 100). The user can parameterise an automatic or manual validation and retains the possibility of modifying at any moment the envelopes 41 generated by the image analyser 14.

The image analyser 14 can further be configured to determine the shape of the drops at a given distance (distance d).

In a so-called "expert" operating mode of the image analyser 14, the drops are analysed over all or part of the distance that they will have to cover during the application. The cameras 12a-12b provide a film from which may be determined:
  the direction of the drops;
  the shape of drops (at several points of their travel);
  the barycentre of the drops;
  the point of creation of the drops, that is to say the point where the jet of paint commonly called "filament" breaks to form a drop;
  the speed of the drops; and
  the time the drops take to cover the targeted application distance.

In this expert mode, it is thus possible to evaluate the evolution of a drop throughout the duration of its travel (this evaluation being made from shots of several different drops ejected by the same nozzle).

The control of the drops may be carried out with different paint compositions and different ejection parameters. These ejection parameters are for example the ejection frequency, the wave shape (which describes the movement of the actuator of the nozzle as a function of time: rise curve, time remaining open, close curve), the ejection force and the pressure at which the paint is supplied to the nozzles. A set of parameters is defined for each of the operating modes of the applicator 20. A digital tracing 40 can then be created for each paint composition—set of ejection parameters pairing.

Apart from the characteristics of the drops, the image analyser 14 can determine the state of cleanliness of the ejection face 21 of the applicator 20. To do so, an image provided by the third camera 12c may be compared with a reference image, taken before the first use of the applicator (or when the ejection plate is considered as clean) and memorised in the memory of the computer. From the image provided by the third camera 12c, the image analyser 14 can further determine the shape of the meniscuses at the level of the nozzles during and after ejection.

Other image analysis techniques, known to those skilled in the art, may be implemented by the image analyser 14.

The analysis system 10 described above may be used during the development of applicators and/or the elaboration of coating products. It may also form part of a paint (or other coating product) coating installation, in order to analyse the drops in production, typically before starting a paint application cycle. Thus, another aspect of the invention relates to a coating installation.

Figure 4:
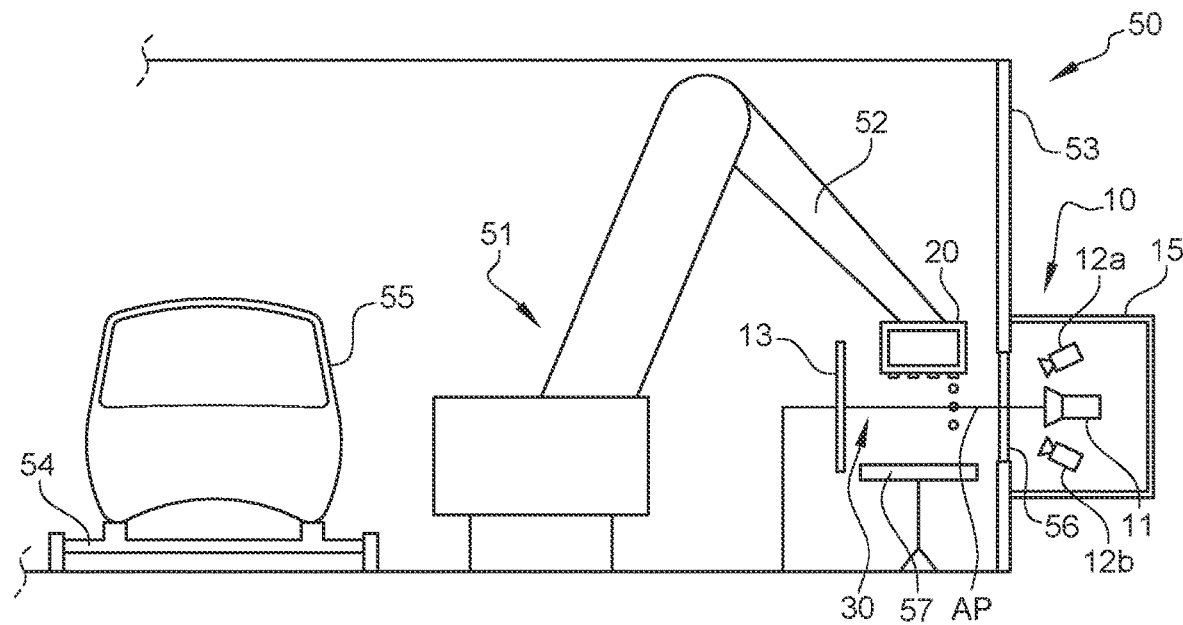
FIG. 4 represents a first embodiment of a coating installation according to the second aspect of the invention.
Figure 5:
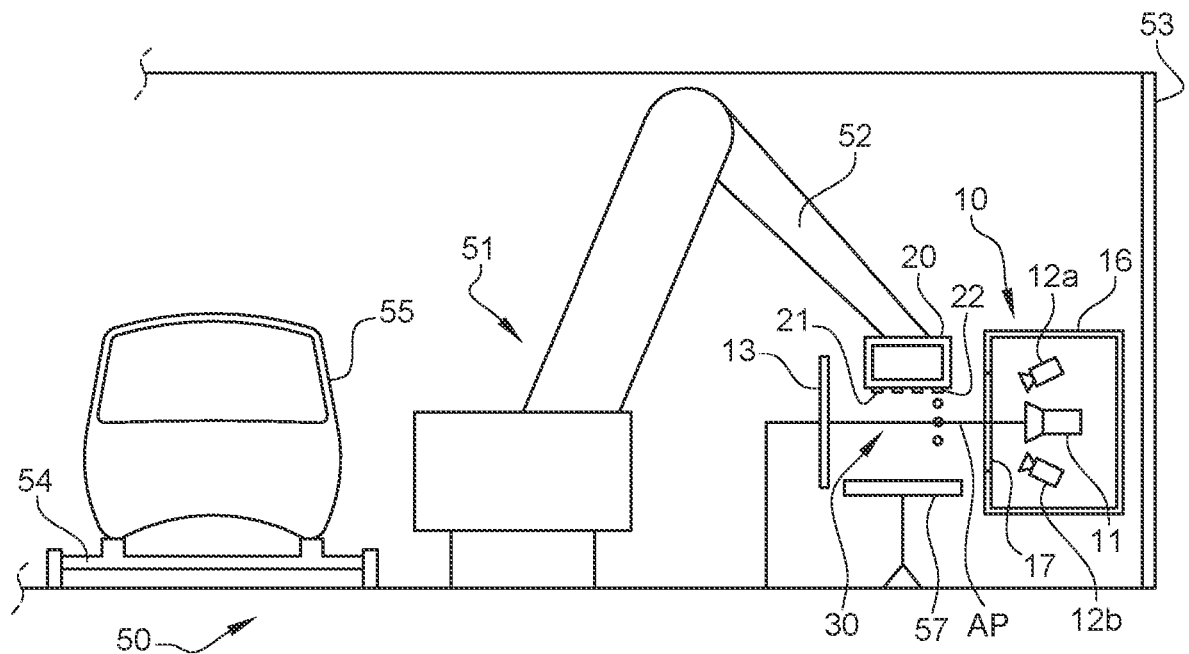
FIG. 5 represents a second embodiment of a coating installation according to the second aspect of the invention.

FIGS. 4 and 5 represent first and second embodiments of a coating installation 50. The coating installation 50 comprises, apart from the analysis system 10 and the applicator 20, a multi-axis robot 51. The multi-axis robot 51 is provided with a moveable arm 52, at the end of which the applicator 20 is mounted.

The coating installation 50 may also comprise a cabin 53 in which the multi-axis robot 51 is arranged. The inside of the cabin 53 may constitute an explosive atmosphere zone. Indeed, coating products (such as paint) can release inflammable gases during their application notably on account of the presence of solvent in the composition of these coating products.

The coating installation 50 may also comprise a conveyor 54 which extends at least in part inside the cabin 53, near to the multi-axis robot 51. The conveyor 54 is able to displace one or several supports to paint, for example bodyworks of automobile vehicles 55. Thus, the coating installation 50 may be an installation for painting automobile bodyworks.

The analysis system 10 may be arranged in different manners within the coating installation 50.

In the first embodiment illustrated by FIG. 4, the light source 11, the first camera 12a and the optional second and third cameras 12b-12c are arranged outside the cabin 53. At least one glazed wall 56, belonging to the cabin 53, separates them from the observation zone 30 (or drop ejection zone, situated inside the cabin 53).

This arrangement is made possible by the fact that the light source 11 and the cameras 12a-12c of the analysis system 10 are grouped together on a same side of the observation zone 30. Thus, these electric/electronic elements do not need to comply with regulations relating to explosive atmospheres (ATEX in Europe). The result is an analysis system 10 less expensive and easier to install.

The computer capable of implementing the image analyser 14 is also outside the cabin 53, It is distinct from the automaton for controlling the installation and in communication with this automaton. In the case of a calculator on electronic board, it may be embedded near to the cameras. The computer (or the electronic board) can communicate with a computer supervising the installation or any other computer required for the coating process. It may communicate with a "cloud" database of the factory.

The background 13 is on the other hand situated inside the cabin 53 (because arranged on the opposite side of the observation zone 30).

The analysis system 10 may further comprise a casing 15 in which the light source 11 and the cameras 12a-12c are arranged. The casing 15 is, in this first embodiment of the coating installation 50, open on the side and placed in front of the glazed wall 56 of the cabin 53. It is, in an embodiment, fixed to the cabin 53. After the installation of the casing 15 and the cameras 12a-12c, a step of calibration of the cameras 12a-12c may be accomplished, in order to compensate deformations due to the glazed wall 56. The electronic board may also be installed in this casing 15.

In an alternative of this first embodiment (not represented by the figures), the glazed wall belongs to the casing 15 of the analysis system 10, The casing 15 is arranged in an opening made in a side wall of the cabin 53. The glazed wall may be situated in the extension of the side wall of the cabin 53 or in advanced position towards the interior of the cabin 53 to be as close as possible to the observation zone 30.

In the second embodiment illustrated by FIG. 5, the analysis system 10 comprises a caisson 16 provided with at least one glazed wall 17. The caisson 16 is arranged inside the cabin 53. The light source 11 and the cameras 12a-12c are arranged inside the caisson 16, They are separated from the observation zone 30 by the glazed wall 17, "Caisson" is taken to mean a closed casing, sufficiently leak tight to be able to be pressurised. The caisson 16 is connected to a pressurisation system, such as a compressed air source. The pressurisation system may also form part of the coating installation 50. In operation, the caisson 16 is pressurised, for example with air coming from outside the cabin 53. "Pressurised" is taken to mean that the pressure inside the caisson 16 is higher than the pressure inside the cabin 53. Thus, inflammable gases of the explosive atmosphere zone do not risk penetrating into the caisson 16.

In so far as the glazed wall belongs to the casing 15 or to the caisson 16, the step of calibration of the cameras may be accomplished in the factory, prior to the installation of the analysis system 10.

In each of the embodiments (and alternative) described hereafter, the inside of the casing 15 or the caisson 16 is beneficially matt black in order to avoid any reflection of light which could adversely affect the quality of the images.

The lighting and the observation of the drops may be carried out through one or more glazed walls, as a function for example of the angles of inclination $\alpha 1$, $\alpha 2$, $\alpha 3$ between the light source 11 and each of the cameras 12a-12c. When the angle of inclination between the light source 11 and each of the cameras 12a-12c is small, typically less than 15°, a single glazed wall (belonging to the cabin 53, to the casing 15 or to the caisson 16) may be provided, common to the light source 11 and to the cameras 12a-12c. This glazed wall is beneficially oriented perpendicularly to the light propagation axis AP of the light source 11.

Conversely, when at least one of the angles of inclination $\alpha 1$, $\alpha 2$, $\alpha 3$ is important, typically greater than 15°, several glazed walls may be provided and, at the most, as many glazed walls as there are optical apparatuses. More particularly, a first glazed wall may be provided oriented perpendicularly to the light propagation axis AP of the light source 11, a second glazed wall oriented perpendicularly to the optical axis AO1 of the first camera 12a (when $\alpha 1 > 15°$), if necessary a third glazed wall oriented perpendicularly to the optical axis AO2 of the second camera 12b (when $\alpha 2 > 15°$) and if necessary a fourth glazed wall oriented perpendicularly to the optical axis AO3 of the third camera 12c (when $\alpha 3 > 15°$).

In the first embodiment of the coating installation (cf. FIG. 4) and its alternative, the observation zone 30 is situated near to a side wall of the cabin 53. In the second embodiment (cf. FIG. 5), the analysis system 10 may be placed more freely.

The coating installation 50 may comprise several multi-axis robots each equipped with an applicator 20. The analysis system 10 is then beneficially placed such that the observation zone 30 is accessible by at least two robots 51 of the installation.

Still with reference to FIGS. 4 and 5, the coating installation 50 may comprise a paint recovery device 57 arranged under the observation zone 30, directly in line with the applicator 20. The paint recovery device 57 may be associated with a cleaning system. The paint recovery device 57 and the optional associated cleaning system, as well as the background 13, are beneficially fixed to the caisson/casing, such that the assembly can be factory mounted and tested before installation.

The background 13 of the analysis system 10 may be fixed with respect to the cabin 53. In this case, if the visual field of the first and second cameras 12a-12b is sufficiently wide to encompass the two parts 13a-13b of the background 13 (cf. FIGS. 1-2), only the applicator 20 is displaced by the robot 51 during a drop analysis step to be positioned in front of the part of the background 13 procuring the best contrast. The light source 11 and the cameras 12a, 12b and 12c are then fixed with respect to the cabin 53. The height of the visual field of the cameras is greater than or equal to two times the application distance.

Alternatively, the background 13 is moveably mounted with respect to the cabin 53, whereas the light source 11 and the cameras 12a-12c are fixed. The background 13 may be displaced by the robot 51, a jack or a motor for positioning the most appropriate part of the background 13 in the visual field of the first and second cameras 12a-12b.

The image sensors of the first and second cameras 12a-12b may have a minimum definition of 1332×990 pixels. The cameras 12a-12b beneficially have a visual field capable of containing the drops ejected by all of the nozzles 22 of a row. Nevertheless, with the aim of reducing the cost of the analysis system, it may be chosen from cameras 12a-12b having a more restricted visual field and which only covers a single part of the nozzles 22 of a row.

If the visual field of the cameras (which is notably a function of the number and the size of the pixels) is not sufficiently wide to observe the ejection from all the nozzles 22 of a row simultaneously, but a part only of the nozzles, then the applicator 20 is displaced by the robot 51 between the ejection from a first part of the nozzles 22 and the ejection from a second part of the nozzles 22, such that the drops ejected by all the nozzles 22 are on a same image. It is also possible to acquire one (or several) first image(s) with the ejection from the first part from the nozzles 22 then, after displacement of the applicator 20, one (or several) second image(s) with the ejection from the second part from the nozzles 22.

Alternatively, it is possible to provide several pairs of cameras 12a-12b, each pair of cameras 12a-12b having in its visual field a part of the nozzles 22.

In the case of an applicator 20 comprising several rows of nozzles 22, the analysis of the drops beneficially takes place row after row.

The automaton of the coating installation 50 is beneficially provided with intelligent functions, such as:
- determining the causes of disfunction of the applicator 20, establishing a diagnosis and proposing palliative or corrective measures;
- anticipating maintenance operations;
- observing trends to deduce alarms therefrom.

To implement these functions, the automaton can receive, apart from the results of the analysis of the drops (characteristics of the drops):
- information relating to the paint (hue used, time of use from the last change of hue, number of supports painted with this hue, temperature, pressure, viscosity of the paint, etc.);
- information relating to the atmosphere in the cabin (temperature, moisture content, ventilation speed);
- information relating to the (pneumatic or electric) control of the print head;
- information relating to the applicator (identifier of the print head and its fluid components, temperatures, operating time of each nozzle of the head), which may be saved in a memory of the applicator;

information relating to the robot (identification, maintenance parameters, trajectory notably); and information relating to the oven making it possible to dry the supports after painting (temperature, temperature increase and decrease ramps).

Thus, the automaton is in communication with the different elements of the coating installation (robot, applicator, cabin, ventilation system, oven, etc.). It may also implement automatic learning methods (e.g. deep learning) to learn to recognise drop defects and, more generally, the causes of disfunction of the applicator.

Figure 6:
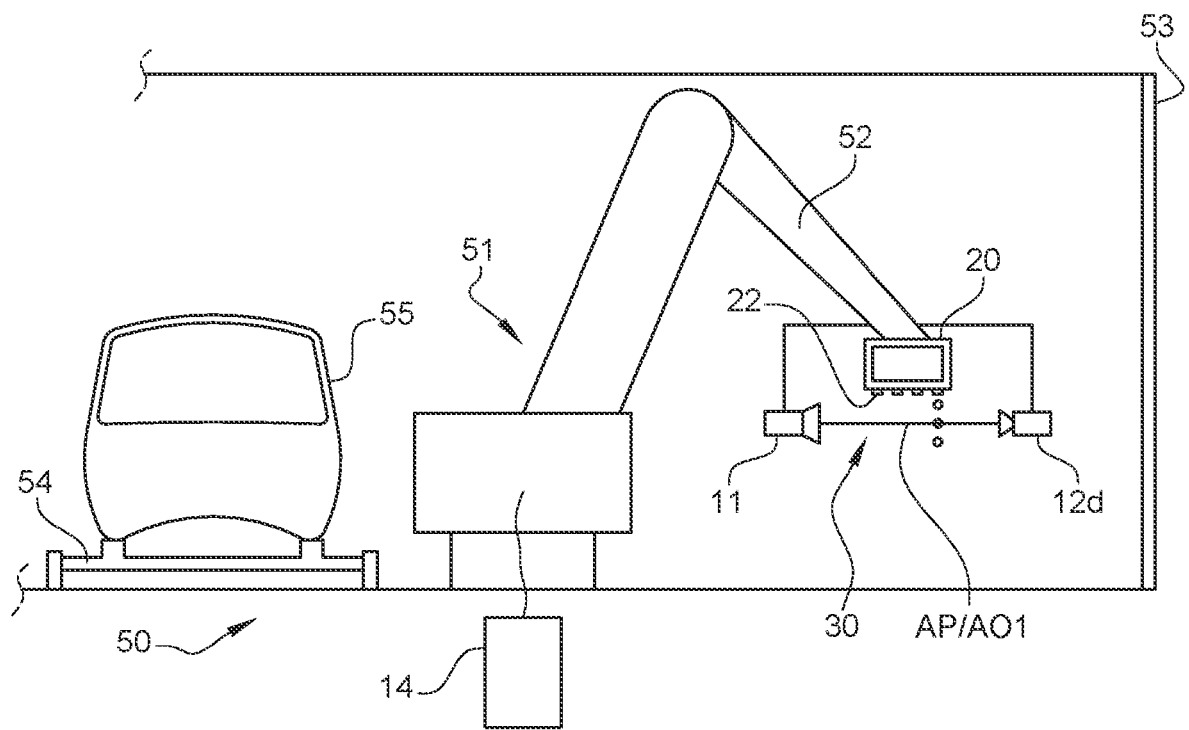
FIG. 6 represents another embodiment of a coating installation.

In another embodiment represented schematically by FIG. 6, the coating installation 50 comprises the robot 51 provided with its moveable arm 52, the coating product applicator 20 mounted at an end of the moveable arm 52 and a system for analysing drops 60 fixed to the moveable arm 52 of the robot 51. The analysis system 60 comprises the light source 11 configured to illuminate the drop ejection zone 30 (situated directly in line with the applicator 20) and at least one image acquisition device 12d oriented towards the drop ejection zone 30. The light source 11 is arranged on a first side of the drop ejection zone 30, whereas the image acquisition device 12d is arranged on a second side opposite the drop ejection zone 30. In an embodiment, the light propagation axis AP of the light source 11 and the optical axis AO1 of the image acquisition device 12d are merged or parallel with each other.

Thus, in this so-called "embedded" configuration, the system for analysing drops 60 is mounted on the moveable arm 52 of the robot 51 and operates according to the ombroscopy principle. A background or screen is not useful. The analysis of the drops may thus be accomplished during the coating process (typically during a cycle of application of paint on automobile vehicle bodyworks 55).

The image acquisition device 12d may comprise a single array of pixels, for example in strip form, dimensioned to observe the ejection from all or part of the nozzles 22 of a row. Alternatively, the image acquisition device 12d comprises several arrays of pixels. Each array of pixels makes it possible to take images of the ejection from a part only of the nozzles 22 of a row. Indeed, providing several arrays of pixels of small size may be a solution that is more beneficial economically than providing a single large array of pixels. The arrays of pixels are in an embodiment aligned in the direction of the row of nozzles 22.

One benefit of this embedded configuration is to be able to determine the quality of ejection of the drops throughout the entire coating process.

According to a development of this embodiment, the image acquisition device 12d comprises as many arrays of pixels as there are nozzles 22 in a row.

The analysis of the drops is carried out thanks to the image analyser 14, for example in the manner described in relation with FIG. 3. The image analyser 14 can analyse the images coming from the different arrays of pixels one after the other (image after image) or analyse an image reconstituted from images coming from the different arrays of pixels. The images are, in an embodiment, conveyed to the image analyser 14 via the control circuit of the robot 51. The image analyser 14 is beneficially integrated in the automaton of the robot 51.

The light source 11 is, in an embodiment, a stroboscope synchronised with the ejection of the drops, as described previously.

The analysis system 60 may comprise a second image acquisition device, the optical axis of which is inclined with respect to the optical axis AO1 of the image acquisition device 12d so as to determine the direction of the drops.

The light source 11 and the image acquisition device(s) may be contained in a casing (not represented), fixed to the moveable arm 52 of the robot 51 and of which the interior is beneficially matt black. This casing is open downwards.

Numerous alternatives and modifications of the system for analysing drops and of the coating installation according to the invention will become clear to those skilled in the art.

Rather than observe and analyse the drops during their flight, it is possible to analyse the drops once deposited on the support to coat. This makes it possible to verify the quality of the application in real time and to decide whether parameters may be adjusted. Thus, the system for analysing drops may comprise one (or several) camera(s) oriented towards the support.

The invention claimed is:

1. A system for analysing drops capable of being ejected by a coating product applicator, said system comprising:
    a light source configured to illuminate a drop ejection zone, which forms an observation zone;
    a first image acquisition device configured to acquire an image of the observation zone;
    a second image acquisition device configured to acquire an image of the observation zone;
    an image analyser configured to determine, from the image of the observation zone, a presence of drops at a given distance from the coating product applicator, a size of the drops and an absence of satellite;
and wherein the light source and the first image acquisition device are situated on a same side of the observation zone, the second image acquisition device being arranged on the same side of the observation zone as the light source and the first image acquisition device, the first and second image acquisition devices being situated on either side of the light source.

2. The system according to claim 1, wherein the light source has a light propagation axis, wherein the first image acquisition device has a first optical axis situated in a same plane as the light propagation axis, the first optical axis forming with the light propagation axis an angle α1 greater than or equal to 0° and less than or equal to 45°.

3. The system according to claim 1, further comprising a background situated opposite the light source with respect to the observation zone, the background comprising a first part of a first hue and a second part of a second hue, the first hue being darker than the second hue.

4. The system according to claim 1, wherein the first image acquisition device is configured to acquire images of the observation zone at an acquisition frequency less than or equal to the drop ejection frequency divided by two.

5. The system according to claim 4, wherein the first image acquisition device is configured to acquire images of the observation zone at an acquisition frequency less than or equal to the drop ejection frequency divided by five.

6. The system according to claim 1, wherein the first image acquisition device is controlled by a circuit for controlling the ejection of the drops.

7. The system according to claim 1, wherein the light source is a stroboscope and wherein a frequency of the stroboscope is equal to n times an acquisition frequency of the first image acquisition device, with n a natural integer greater than or equal to 2.

8. The system according to claim 7, wherein n is greater than or equal to 5.

9. The system according to claim 1, wherein the image analyser is further configured to determine, from the image of the observation zone, one or more characteristics chosen from among the following: a direction of the drops, a shape of the drops, a point of creation of the drops and a speed of the drops.

10. A coating installation comprising:
a multi-axis robot comprising a moveable arm;
a coating product applicator mounted at an end of the moveable arm and comprising at least one drop ejection nozzle; and
a system for analysing drops according to claim 1.

11. The coating installation according to claim 10, further comprising:
a cabin in which the multi-axis robot is arranged;
at least one glazed wall;
the light source and the first image acquisition device being arranged outside of the cabin and separated from the observation zone by said at least one glazed wall.

12. The coating installation according to claim 11, wherein said at least one glazed wall belongs to the cabin.

13. The coating installation according to claim 11, wherein the system for analysing drops further comprises a casing, wherein said at least one glazed wall belongs to the casing and wherein the casing is arranged in an opening made in a side wall of the cabin.

14. The coating installation according to claim 10, further comprising:
a cabin in which the multi-axis robot is arranged;
a caisson arranged inside the cabin and provided with at least one glazed wall;
the light source and the first image acquisition device being arranged inside the caisson and separated from the observation zone by said at least one glazed wall.

15. The coating installation according to claim 10, wherein the system for analysing drops further comprises a third image acquisition device oriented towards a face of the coating product applicator in which said at least one drop ejection nozzle is arranged.

16. The coating installation according to claim 10, wherein the coating product applicator is a drop on demand type print head.

\* \* \* \* \*